(12) United States Patent
Brzezowsky et al.

(10) Patent No.: US 10,792,672 B2
(45) Date of Patent: Oct. 6, 2020

(54) DEVICE AND METHOD FOR PROCESSING THERMOPLASTIC PLASTIC HAVING A BLOWING DEVICE FOR A CONVEYING SCREW

(71) Applicant: Next Generation Recyclingmaschinen GmbH, Feldkirchen an der Donau (AT)

(72) Inventors: Klaus Brzezowsky, Marchtrenk (AT); Klemens Gruber, Rainbach (AT); Thomas Pichler, St. Peter am Wimberg (AT)

(73) Assignee: Next Generation Recyclingmashinen GmbH, Feldkirchen an der Donau (AT)

( * ) Notice: Subject to any disclaimer, the term of this patent is extended or adjusted under 35 U.S.C. 154(b) by 338 days.

(21) Appl. No.: 15/761,494

(22) PCT Filed: Sep. 21, 2016

(86) PCT No.: PCT/EP2016/072416
§ 371 (c)(1),
(2) Date: Apr. 12, 2018

(87) PCT Pub. No.: WO2017/050822
PCT Pub. Date: Mar. 30, 2017

(65) Prior Publication Data
US 2018/0257268 A1 Sep. 13, 2018

(30) Foreign Application Priority Data
Sep. 22, 2015 (AT) .............................. A 50808/2015

(51) Int. Cl.
*B02C 25/00* (2006.01)
*B29C 48/14* (2019.01)
(Continued)

(52) U.S. Cl.
CPC ............ *B02C 25/00* (2013.01); *B02C 18/148* (2013.01); *B02C 18/2258* (2013.01);
(Continued)

(58) Field of Classification Search
CPC ... B02C 25/00; B02C 18/148; B02C 18/2258; B02C 23/26
(Continued)

(56) References Cited

U.S. PATENT DOCUMENTS 3,638,921 A * 2/1972 Bredeson ................ B29C 48/92
241/60
4,394,980 A * 7/1983 Marz ................... B01F 15/0201
241/46.02
(Continued)

FOREIGN PATENT DOCUMENTS

CN 101610886 A 12/2009
CN 203400752 U 1/2014
(Continued)

OTHER PUBLICATIONS

International Search Report of PCT/EP2016/072416, dated Dec. 14, 2016.

*Primary Examiner* — Faye Francis
(74) *Attorney, Agent, or Firm* — Collard & Roe, P.C.

(57) ABSTRACT

A device for processing thermoplastic plastic includes a storage container for receiving pieces of plastic particles or a conveying line for conveying the pieces of plastic particles, and a conveying screw following the storage container/the conveying line at a transfer opening. The device also includes an extruder following the conveying screw and an air outlet arranged opposite the transfer opening and directed at this opening. In a method for operating the device, an air stream is aligned with the transfer opening.
(Continued)

The strength and/or the direction of the air stream is adjusted or controlled as a function of a load on the extruder.

18 Claims, 5 Drawing Sheets

(51) Int. Cl.
| | |
|---|---|
| B29C 48/25 | (2019.01) |
| B29B 17/00 | (2006.01) |
| B02C 18/14 | (2006.01) |
| B29C 48/39 | (2019.01) |
| B02C 18/22 | (2006.01) |
| B29B 17/04 | (2006.01) |
| B29C 48/285 | (2019.01) |
| B29C 48/50 | (2019.01) |
| B02C 23/26 | (2006.01) |
| B29L 7/00 | (2006.01) |
| B29K 23/00 | (2006.01) |
| B29C 48/38 | (2019.01) |
| B29C 48/92 | (2019.01) |

(52) U.S. Cl.
CPC .......... *B29B 17/00* (2013.01); *B29B 17/0412* (2013.01); *B29C 48/142* (2019.02); *B29C 48/143* (2019.02); *B29C 48/2526* (2019.02); *B29C 48/39* (2019.02); *B02C 23/26* (2013.01); *B29B 17/0026* (2013.01); *B29C 48/2528* (2019.02); *B29C 48/287* (2019.02); *B29C 48/298* (2019.02); *B29C 48/38* (2019.02); *B29C 48/501* (2019.02); *B29C 48/92* (2019.02); *B29C 2948/92114* (2019.02); *B29C 2948/92219* (2019.02); *B29C 2948/92828* (2019.02); *B29K 2023/10* (2013.01); *B29L 2007/008* (2013.01); *Y02W 30/62* (2015.05)

(58) Field of Classification Search
USPC .................................... 241/62, 186.5, 260.1
See application file for complete search history.

(56) References Cited

U.S. PATENT DOCUMENTS

| | | | | |
|---|---|---|---|---|
| 4,460,277 A | * | 7/1984 | Schulz | B29B 7/7461 |
| | | | | 366/76.3 |
| 4,467,969 A | * | 8/1984 | Godfrey | B29B 17/0005 |
| | | | | 241/101.8 |
| 5,704,555 A | * | 1/1998 | Arastoopour | B29B 17/04 |
| | | | | 241/16 |
| 5,743,471 A | * | 4/1998 | Ivanov | B29B 13/10 |
| | | | | 241/16 |
| 6,021,966 A | * | 2/2000 | Doenges | B02C 13/08 |
| | | | | 241/189.1 |
| 6,126,100 A | * | 10/2000 | Barth | B02C 18/145 |
| | | | | 241/243 |
| 6,749,138 B2 | * | 6/2004 | Hart | B02C 18/144 |
| | | | | 241/186.5 |
| 6,877,685 B2 | * | 4/2005 | Barth | B02C 18/145 |
| | | | | 241/260.1 |
| 8,616,478 B2 | * | 12/2013 | Weigerstorfer | B02C 18/12 |
| | | | | 241/57 |
| 8,672,662 B2 | | 3/2014 | Lovranich et al. | |
| 2012/0037739 A1 | | 2/2012 | Lovranich et al. | |
| 2012/0217330 A1 | * | 8/2012 | Fleury | B01F 3/10 |
| | | | | 241/101.8 |
| 2013/0087641 A1 | * | 4/2013 | Hackl | B08B 3/10 |
| | | | | 241/15 |
| 2014/0312151 A1 | * | 10/2014 | Feichtinger | B01F 15/0251 |
| | | | | 241/101.2 |

FOREIGN PATENT DOCUMENTS

| | | |
|---|---|---|
| CN | 203862354 U | 10/2014 |
| DE | 197 14 944 A1 | 4/1998 |
| EP | 0 934 144 B1 | 4/2004 |
| GB | 2 301 795 B | 1/2000 |
| JP | S60-120027 A | 6/1985 |
| JP | H11-300811 A | 11/1999 |
| JP | 2000000822 A | 1/2000 |
| WO | 96/40483 A1 | 12/1996 |
| WO | 01/47678 A1 | 7/2001 |
| WO | 2010/089173 A2 | 8/2010 |
| WO | 2010/089174 A1 | 8/2010 |
| WO | 2011/014902 A1 | 2/2011 |

* cited by examiner

DEVICE AND METHOD FOR PROCESSING THERMOPLASTIC PLASTIC HAVING A BLOWING DEVICE FOR A CONVEYING SCREW

CROSS REFERENCE TO RELATED APPLICATIONS

This application is the National Stage of PCT/EP2016/072416 filed on Sep. 21, 2016, which claims priority under 35 U.S.C. § 119 of Austrian Application No. A 50808/2015 filed on Sep. 22, 2015, the disclosure of which is incorporated by reference. The international application under PCT article 21(2) was not published in English.

The invention relates to a device for processing thermoplastic plastic which comprises a storage container for receiving pieces of plastic particles or a conveying line for conveying the pieces of plastic particles, a conveying screw following the storage container/the conveying line at a transfer opening and an extruder following the conveying screw. The device also has at least one air outlet situated opposite the transfer opening (pointing through the container/conveying line) and directed or able to be directed at the transfer opening. The invention also relates to a method for operating the above device.

A device and a method of a similar type are known in principle from the prior art. For example, EP 0 934 144 B1 discloses a device for processing thermoplastic synthetic material. The device comprises a machine housing with a delivery cone and a driven slider which presses the synthetic material to be processed and which is located on a base plate into a processing drum or into a conveyor tube respectively. Blades are arranged in a helix around the processing drum. The blades and the connected screw conveyor convey the crushed synthetic material to an extruder screw into which the synthetic material is discharged.

The disadvantage of this process is particularly due to the intermittent way in which the slider operates, which makes it impossible to convey the synthetic material continuously into the processing drum or into the conveyor tube due to the forwards and backwards movement of the slider. The slider may also compress the synthetic material to a significant extent due to the hydraulic drive and the resulting compression forces, thus causing blockages if the material is not conveyed through the processing drum sufficiently quickly.

In this connection, the device for processing thermoplastic plastic comprising an air outlet directed at the transfer opening, said air outlet being arranged opposite the transfer opening (and pointing through the container/conveying line), is also known in the prior art in principle. Accordingly the principle of aligning an air stream (flowing through the container/the conveying line) with the transfer opening is also known in the prior art. Once again, this leads to problems due to the tendency for blockages, especially if the air stream is relatively strong. The air emerging from the air outlet leaves the device for processing thermoplastic plastic and is then forced to pass via the storage container or the conveying line. This thus leads to turbulence in the storage container/conveying line, causing large quantities of dust to form and be discharged from the machine depending on the properties of the material supplied for processing.

One object of the invention is therefore to provide an improved device and an improved method for processing thermoplastic plastic. In particular, it should be possible to continuously convey plastic particles into a processing drum or into a conveying screw respectively. In addition, blockages in the region of a transfer opening to the processing drum or conveying screw respectively should be avoided if at all possible.

The object of the invention is achieved with a device of the above-mentioned type, comprising means to record a load on a drive of the extruder, means to influence an air stream emerging from the at least one air outlet, and a control unit connected to the recording means and the influencing means.

The object of the invention is also achieved with a method for operating the above device, in which the strength/direction of the air stream is adjusted or controlled depending on a load on the extruder.

The required quantity of plastic particles can be blown into the conveying screw from the container or from the conveying line as a result of the proposed measures. In other words, it is possible to adjust or control the supply of plastic particles into the extruder by means of its filling level. On the one hand, this makes it possible to have a continuous supply of plastic particles into the processing drum or conveying screw respectively, but on the other hand, it is also possible to avoid blockages in the region of the transfer opening, as although the supplied material is loosened by the air stream, it is not whirled up. This leads to a relatively low risk of dust pollution. The largely stable conditions in the loaded extruder are also particularly advantageous, as a result of which the plastic material can be produced very uniformly. As a rule, large bulk weights of the supplied material require lower air speeds than small bulk weights.

The means of influencing the strength of the air stream may, for example, involve a valve or a slider, with which a cross-section of the air stream supply, and thus the strength of the air stream, can be varied. However, the means of influencing the strength of the air stream may also involve a compressor which supplies compressed air to the at least one air outlet and where the output of the compressor is varied to influence the strength of the air stream. The means of directing the air stream may, for example, include a pivotable nozzle, but may also include pivotable flaps which are also able to vary the cross-section of the air stream supply line.

As a general rule, the supply of plastic particles to the conveying screw may substantially be based on the air stream or may take place exclusively by means of the air stream. In this particular context, the term "substantially" specifically means that at least 70% of the material transport operation is due to the effect of the air stream. In particular, the supply of plastic particles to the conveying screw is still able to take place without using sliders. This means that under no circumstances does the device described in this case have a slider arranged opposite the conveying screw and aligned with said screw.

Further advantageous embodiments and developments of the invention are described in the dependent claims and in the description in conjunction with the figures.

In a particularly advantageous embodiment of the invention, the air stream is increased and/or aligned to a greater extent with the transfer opening when the load on the extruder falls and vice versa. Accordingly it is advantageous if the control unit is designed to increase the air stream when the load on the extruder falls and vice versa. This means that more material is conveyed to the extruder when its filling level falls and vice versa.

In the above connection, it is favorable if a speed of a drive of the extruder, a current consumed by said drive or the torsion of a shaft in the drive is measured in order to determine/calculate the load on the extruder. To this end, a sensor to measure the speed of the drive of the extruder (e.g. a digital incremental encoder), a sensor to measure the current consumed by the drive (e.g. a voltmeter on a current sensing resistor), or, for example, a sensor to measure the torsion of a shaft in the drive (e.g. a measuring bridge with strain gauges) may be provided. As a general rule, the drive may also comprise a gear unit. The above-mentioned speed and the above-mentioned torsion may therefore also be taken from a component in the gear unit. As a general rule, the extruder is subjected to a higher load if the drive speed is lower, the current consumed by the drive is higher or if the torsion in a shaft in the drive increases.

It is advantageous if the means of influencing an air stream emerging from the at least one air outlet are formed by a valve, a slider or a flap. The strength of the air stream (in other words its speed and its flow rate) can be adjusted to good effect using a valve/slider. The direction and, to a certain extent, the strength of the air stream can be adjusted to good effect using a flap.

It is particularly advantageous if the means of influencing an air stream emerging from the at least one air outlet can be adjusted on a proportional basis. Accordingly, it is particularly advantageous if the strength/direction of the air stream can be adjusted on a proportional basis. The particular advantage of adjusting the strength and/or direction of the air stream on a proportional basis is that it makes it possible to keep a relatively low level of turbulence in the storage container/conveying line along with any associated dust formation. This is because the strength/direction of the air stream is very well adjusted to the demand, or is ideally perfectly matched to the demand. As a result, the conditions in the loaded extruder are largely stable, causing the plastics material to be produced very uniformly. Another advantage is that the constant sound emitted by proportional adjustment means is perceived as being more pleasant than an intermittent sound, for example. In addition, proportional adjustment means have a relatively long service life due to their gentle operating regime.

Another advantage of the proportional influencing means for the strength of the air stream (e.g. valve or slider) is that they are less likely to become blocked. Proportional adjustment means generally make it possible to achieve a constant flow rate of any strength. Blockage of the air outlet is rather unlikely due to the continuous air discharge. In addition, in this case a relatively large outlet opening can be selected without the need to also have a very high and undesirable air consumption. This may therefore also counteract blockage of the nozzles. If proportional adjustment means are not used, an air outlet opening would have to be designed to be relatively small for the given system pressure and if a low flow rate is desired, and this would accordingly be more likely to become blocked. The same applies specifically, although not exclusively, to proportional valves, proportional sliders and proportional flaps.

It is also advantageous if the means of influencing an air stream emerging from the at least one air outlet have two discrete positions and the control unit is designed to control said means with a variable pulse-pause ratio. Accordingly, it is advantageous if the strength/direction of the air stream is adjusted on a quasi-proportional basis by switching between two discrete values in a variable pulse-pause ratio. Although the above-mentioned influencing means only have two positions, it is possible to achieve quasi-proportional behavior by pulsing and by the variable pulse-pause ratio. In other words, the strength/direction of the air stream corresponds to a desired value on average. The same applies in particular, but not exclusively, to valves, sliders and flaps comprising just two positions, specifically an "ON" position and an "OFF" position. Such influencing means are advantageously relatively robust due to their simple structure.

It is also particularly advantageous if the conveying screw is aligned in the horizontal direction or its alignment has at least one horizontal component. If the conveying screw is aligned obliquely and accordingly has a horizontal (and vertical) component, conveyance of the plastic particles can be encouraged by inclining the conveying screw downwards. If the screw is inclined upwards, on the other hand, the influence of the air stream will be greater and any available control system will be more direct.

It is also particularly advantageous if a cross-section of the transfer opening is aligned in the vertical direction or its alignment has at least a vertical component. If the cross-section is aligned obliquely and accordingly has a vertical (and horizontal) component, conveyance of the plastic particles can be encouraged if the cross-section is open at the top. If, on the other hand, the cross-section is inclined such that the transfer opening points slightly downwards, the influence of the air stream will be greater and any available control system will be more direct.

In another advantageous embodiment of the invention, the conveying screw comprises crushing means arranged on said screw, said crushing means specifically being formed by teeth and/or by continuous cutters and/or by blades. The material conveyed into the conveying screw can thus be crushed still further before reaching the extruder. Material of optimum size can thus be supplied to the extruder, guaranteeing correct mixing and correct melting of the material, and making it possible to avoid extruder blockages. The conveying screw may thus also be designed (in part) as a processing drum/crushing screw, or may include this function respectively.

The conveying screw may be continuously fitted with cutters and/or teeth and/or blades, or may only have these in a (continuous) partial region (e.g. in a crushing region), said region being adjacent to a start and/or end region in which no cutters, teeth or blades are arranged. Continuous cutters, teeth and blades may be used individually in isolation or in any combination of all three on the conveying screw.

"Continuous cutters" extend substantially over the entire length of the conveying screw or over the entire length of a crushing region respectively. In particular, the continuous cutters may run in a spiral or axial manner. A plurality of continuous cutters may be distributed over the circumference of the conveying screw, or the conveying screw may comprise only one continuous cutter. When the conveying screw rotates, the continuous cutters are moved substantially transversely with respect to their longitudinal extension, or the rotation of the conveying screw causes a movement with such a transverse component respectively. Separation of the plastic particles therefore primarily comes about due to shearing.

"Teeth" may be understood to mean interrupted cutters or cutters with gaps. Their cutters may also run in a spiral or axial manner, and their cutters are also moved transversely with respect to their longitudinal extension when the conveying screw rotates. Separation of the plastic particles therefore primarily comes about due to shearing and tearing.

"Blades" do not have a pronounced axial extension and their cutters extend substantially radially outwards. When the conveying screw rotates, the cutters are once again moved transversely with respect to their longitudinal extension, but the plane of the "back of the blade" is in this case substantially perpendicular to the axis of rotation of the conveying screw. Separation of the plastic particles therefore primarily comes about due to cutting.

In general, it is very hard to distinguish precisely between the separation methods, especially if the cutters are not aligned in an exact axial or radial manner. As a rule, the plastic particles are therefore primarily crushed by shearing, tearing and cutting.

It is also favorable if fixed countercutters, counterblades and opposite teeth are arranged in the region of the conveying screw with its continuous cutters/blades/teeth and interact with said cutters/blades/teeth (especially in the respective crushing region). This improves the cutting capacity of the conveying screw. Separation of the plastic particles is no longer necessarily predominantly achieved by cutting, especially when blades and counterblades are provided, but may also come about by shearing in some cases.

It is also advantageous if the crushing means are arranged in the bottom region of the storage container (and before the transfer opening). This means that the plastic particles can be crushed before they pass into the conveying screw.

Finally, it is also advantageous if a plurality of air outlets are arranged in the region of the conveying screw and/or the crushing means along a helix and/or aligned in the direction of a helix. In the latter case, it is possible to produce a substantially helical air stream. The plastic particles are thus blown into the conveying screw to particularly good effect or transported along said screw with the air stream.

It should be noted at this juncture that the crushing means do not necessarily have to be arranged on the conveying screw, but may in principle also be provided by a crushing device which is separate from the conveying screw and can be driven separately. The comments made above apply accordingly. For example, the crushing device may be designed as a shaft with blades.

It should also be noted that the embodiments disclosed as alternatives to the device for processing thermoplastic plastic and their resulting benefits relate accordingly to the embodiments of the operating method according to the invention and vice versa.

To facilitate understanding of the invention, it is explained below in greater detail with the aid of the following figures, which show highly simplified schematic representations of the following.

By way of an introduction, it should be noted that the same components are provided with the same reference numerals or the same component names in embodiments with different descriptions, which means that the disclosures contained in the description as a whole can be transferred accordingly to the same components with the same reference numerals or the same component names. Selected location information in the description, such as, for example, above, below, at the side of, etc., also refers to the figure immediately described and illustrated, and should be transferred accordingly to the new location if this location changes.

Figure 1:
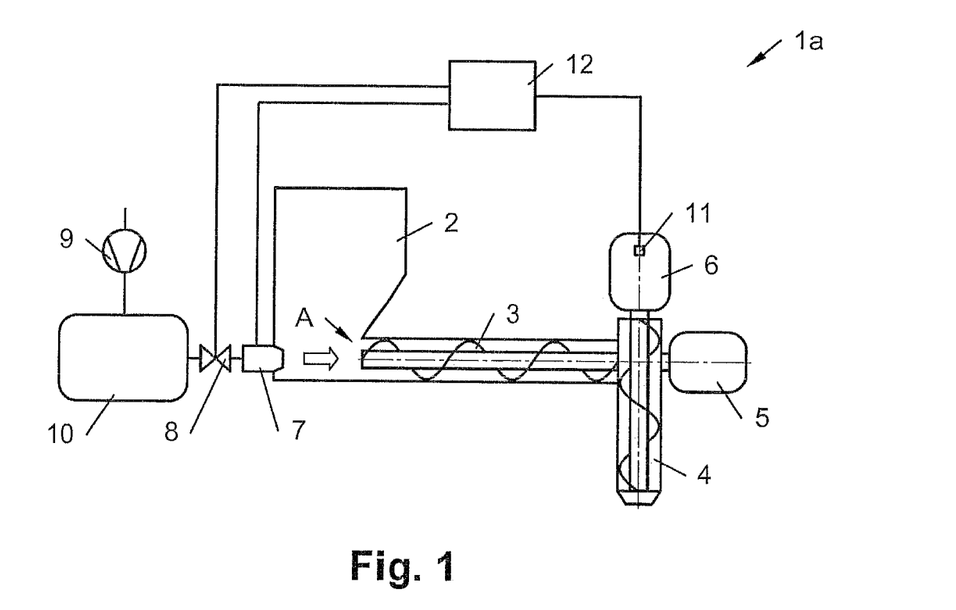
FIG. 1 a schematic representation of a first example of a device for processing thermoplastic plastic with an air outlet designed as a nozzle.

FIG. 1 shows a device 1a for processing thermoplastic plastic which comprises a storage container (2) for receiving pieces of plastic particles and a conveying screw 3 connected to the storage container 2 at a transfer opening A, and an extruder 4 connected to the conveying screw 3. The conveying screw 3 is driven by a first drive motor 5 and the extruder 4 is driven by a second drive motor 6. The conveying screw 3 and the extruder 4 cross each other in the illustrated example. However, note that FIG. 1 is a purely schematic representation and the conveying screw 3 and the extruder 4 can also be arranged differently with respect to one another, and in particular coaxially. It is also conceivable that the conveying screw 3 and the extruder 4 may be driven by a single motor.

In addition to the above-mentioned components, the device 1a also comprises an air outlet 7 (a nozzle in this case) arranged opposite the transfer opening A and directed towards said opening. This forms an air stream directed towards the transfer opening A (see the arrow in FIG. 1). In this way, the plastic particles can be blown into the conveying screw 3, making it possible to avoid blockages in the region of the transfer opening A in principle.

The strength of the air stream can be adjusted, as shown in FIG. 1. To this end, the device 1a comprises a valve 8, which is connected to a compressed air tank 10 supplied by a compressor 9, and forms the means for influencing the air stream emerging from the air outlet 7. This makes it possible to influence the quantity of plastic particles blown into the conveying screw 3.

In the example shown in FIG. 1, the strength of the air stream is also adjusted or controlled as a function of a load on the extruder 4. To this end, the device 1a comprises means 11 for recording a load on the drive 6 of the extruder 4, and a control unit 12 connected to the recording means 11 and the valve 8. The control unit 12 is designed to increase the air stream when the load on the extruder 4 falls and vice versa. In other words, the valve 8 is opened wider when the load on the extruder 4 falls and closed more when the load on the extruder 4 rises.

To determine the load on the extruder 4, the recording means 11 may be designed as a sensor to measure the speed of the drive 6 of the extruder 4 (e.g. as a digital incremental encoder), a sensor to measure the current consumed by this drive 6 (e.g. a voltmeter on a current sensing resistor), or, for example, a sensor to measure the torsion of a shaft in the drive 6 (e.g. a measuring bridge with strain gauges). If the speed of the drive 6 drops, the current consumed by the drive 6 rises or the torsion of a shaft in the drive 6 increases, this is an indication of an increased load on the extruder 4.

Note at this juncture that the drive 6 does not necessarily have to be a motor in isolation; the drive 6 may, for example, also comprise a gear unit. The above-mentioned speed and the above-mentioned torsion may therefore also be taken from a component in the gear unit.

Figure 2:
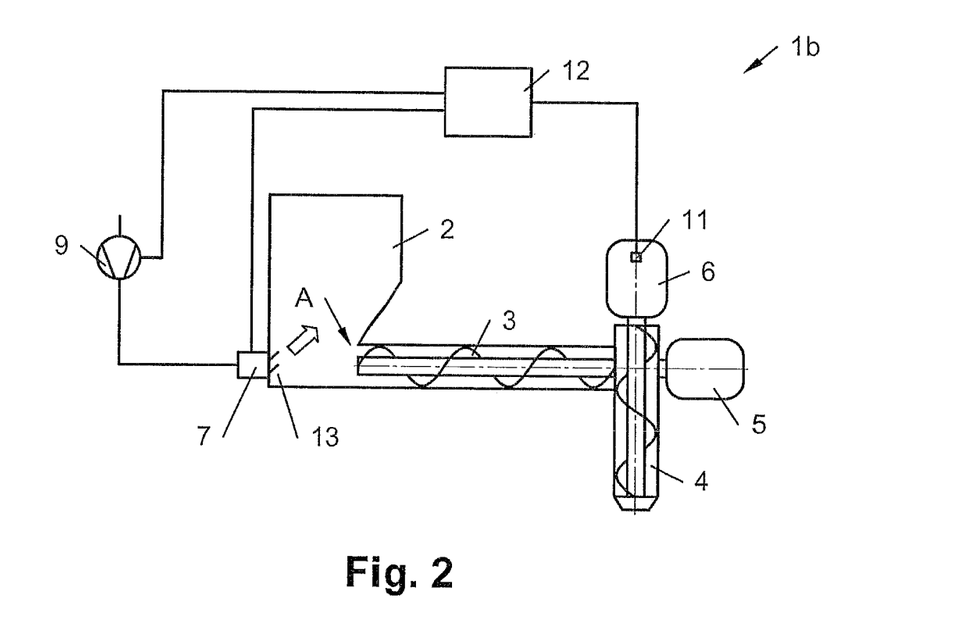
FIG. 2 a second example of a device with pivotable flaps for influencing the direction of the air stream emerging from the air outlet.

FIG. 2 shows a device that is very similar to the device illustrated in FIG. 1a. The difference is that an air outlet with movable flaps 13 is provided instead of the nozzle 7. There is also no valve 8 or compressed air tank 10.

The air stream can be directed away from the transfer opening A by means of the flaps 13. This also makes it possible to influence the quantity of plastic particles conveyed into the conveying screw 3. This is a relatively small quantity in the position of the flaps 13 shown in FIG. 2, but if the flaps 13 are swiveled in the horizontal direction, the quantity of plastic particles conveyed into the conveying screw 3 increases.

In particular, the direction of the air stream is adjusted or controlled as a function of a load on the extruder 4. In this case, the air stream is specifically aligned more towards the transfer opening A (in other words, in this particular example, directed more in the horizontal direction) when the load on the extruder falls and vice versa. The comments made in relation to the device 1*a* about the control unit 12 and the recording means 11 also apply accordingly to the device 1*b*. However, the means for influencing the air stream emerging from the air outlet are formed by the flaps 13. It should be noted at this juncture that the flaps 13 do not only determine the direction of the air stream, but also its strength, especially if the flaps 13 are close to a closing position.

In the example shown in FIG. 2, the compressor 9 is also connected to the control unit 12, which means that this can also be used to influence the strength of the air stream, especially as a function of the load on the extruder 4. The comments made in connection with the valve 8 also apply accordingly to the compressor 9. To reduce the strength of the air stream, the power supply to the compressor 9 can be reduced and vice versa. This is advantageous, but not compulsory, but the compressor 9 can in principle also be operated with constant power.

Of course, it would also be conceivable to use a valve 8 and a pressure tank 10 in connection with the valves 13. In turn, the strength of the air stream can then also be influenced by the valve 8. In particular, the compressor 9 can then operate at constant power, or is controlled/regulated in a manner known per se by means of the pressure prevailing in the pressure tank 10 respectively.

A pivotable nozzle can also be used instead of flaps 13, and a slider can also be used instead of a valve 8, for example, to influence the cross-section of the air stream supply.

Figure 3:
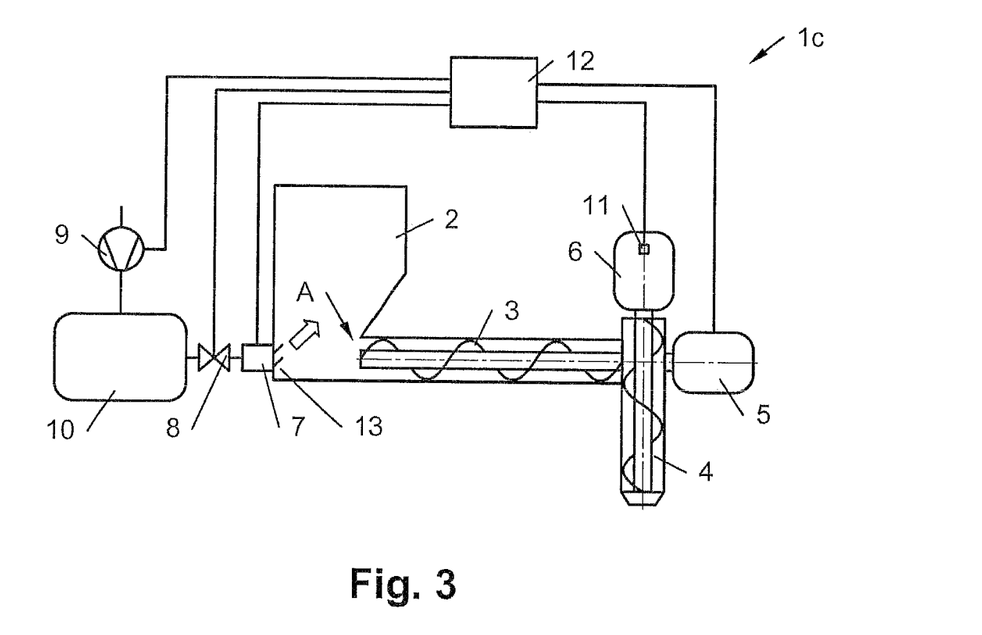
FIG. 3 another example of a device with an extended control unit.

FIG. 3 shows another example of a device 1*c*, which is very similar to the devices 1*a* and 1*b* shown in FIGS. 1 and 2. In the device 1*c*, the drive motor of the conveying screw 3 is in particular also connected to the control unit 12 and is incorporated in the control unit/regulator of the device 1*c*. For example, the speed of the conveying screw 3 can be reduced when the load on the extruder 4 increases and vice versa, especially at the same time as influencing the air stream. The valve 8, the compressor 9 and the flaps 13 can be influenced in the manner described above in this process.

Figure 4:
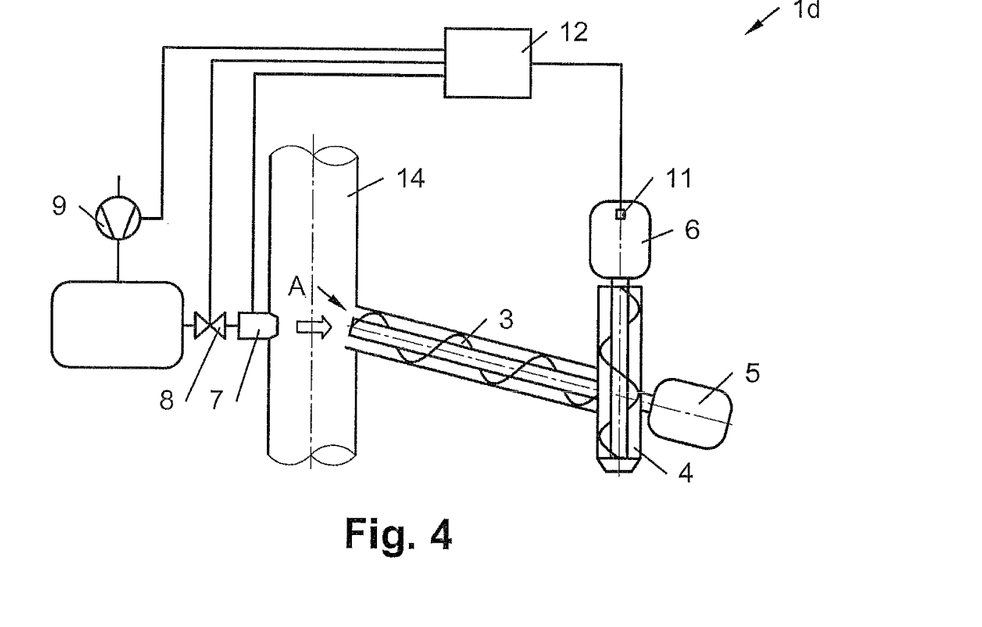
FIG. 4 an example of a device for processing thermoplastic plastic with an obliquely aligned conveying screw and transfer opening.

In the examples described previously, the conveying screw 3 is aligned in the horizontal direction and the transfer opening A is aligned in the vertical direction. This is advantageous, but not compulsory. FIG. 4 shows an alternative example of a device 1*d*, which is designed in a similar manner to the device 1*a* in FIG. 1, but in which the conveying screw 3 and the cross-section of the transfer opening A are aligned obliquely. The alignment of the conveying screw 3 accordingly comprises a horizontal (and a vertical) component, and the alignment of the transfer opening A comprises a vertical (and a horizontal) component. In FIG. 4 the conveying screw 3 is inclined downwards and the transfer opening A is open at the top. This encourages the conveyance of plastic particles into the conveying screw 3. However, it is also conceivable that the conveying screw 3 may be inclined upwards and the transfer opening A may be open at the bottom, thus avoiding plastic particles unintentionally falling into the conveying screw 3. This is a more direct means of regulating via the air stream.

It is also conceivable that only the transfer opening A may be inclined (upwards or downwards), but the conveying screw 3 is aligned horizontally. Alternatively, the conveying screw 3 is inclined and the transfer opening A remains aligned in the vertical direction. It is also conceivable that the conveying screw 3 and the transfer opening A are inclined in the opposite direction. In other words, the conveying screw 3 may be aligned obliquely downwards and the transfer opening may also be open at the bottom. The reverse case, in which the conveying screw 3 is inclined obliquely upwards and the transfer opening A is open at the top is also conceivable.

In particular, FIG. 4 also shows that the device 1*d* does not necessarily comprise a container 2, but that the conveying screw 3 is connected to a conveying line 14 as illustrated. Plastic particles are not only conveyed to the conveying screw 3 via the conveying line 14, but are also conveyed to other units (not illustrated). In particular, the conveying direction is from the top to the bottom. Some of the material transported in the conveying line 14 can be diverted and conveyed into the conveying screw 3 by the air stream and also due to the fact that the transfer opening A is inclined towards the transport direction in the conveying line 14.

As a general rule, it is also advantageous if the conveying screw 3 comprises cutters, teeth and/or blades which are arranged radially. The material conveyed into the conveying screw 3 can thus be crushed still further before reaching the extruder 4. The conveying screw 3 may thus also be designed (in part) as a processing drum/crushing screw, or may include this function respectively.

Figure 5:
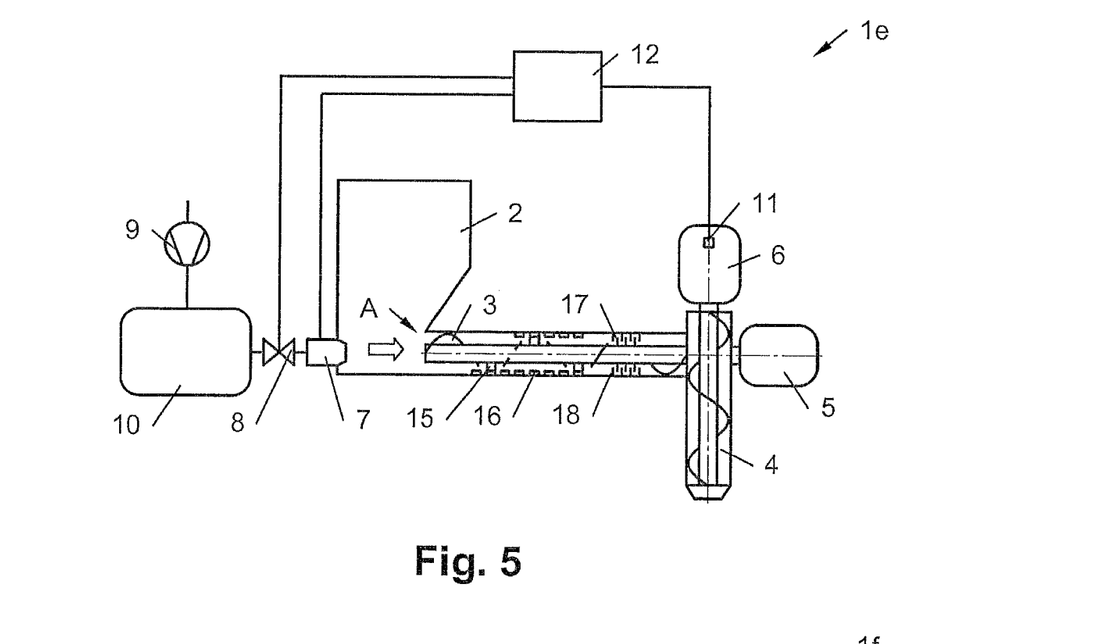
FIG. 5 as FIG. 1, but with teeth and blades on the conveying screw.

FIG. 5 shows how such a conveying screw 3 may be designed by means of a device 1*e*, which substantially corresponds to the device 1*a* shown in FIG. 1. In specific terms, the conveying screw 3 of the device 1*e* comprises teeth 15 and opposite teeth 16, and blades 17 and counter-blades 18, said teeth 15 and opposite teeth 16 tending to be arranged in the front region of the conveying screw 3, and said blades 17 and counterblades 18 being arranged in the end region of the conveying screw 3. The material conveyed into the conveying screw 3 is thus crushed still further before reaching the extruder 4. Material of optimum size can thus be supplied to the extruder 4, guaranteeing correct mixing and melting of the material, and making it possible to avoid blockages in the extruder 4.

Figure 6:
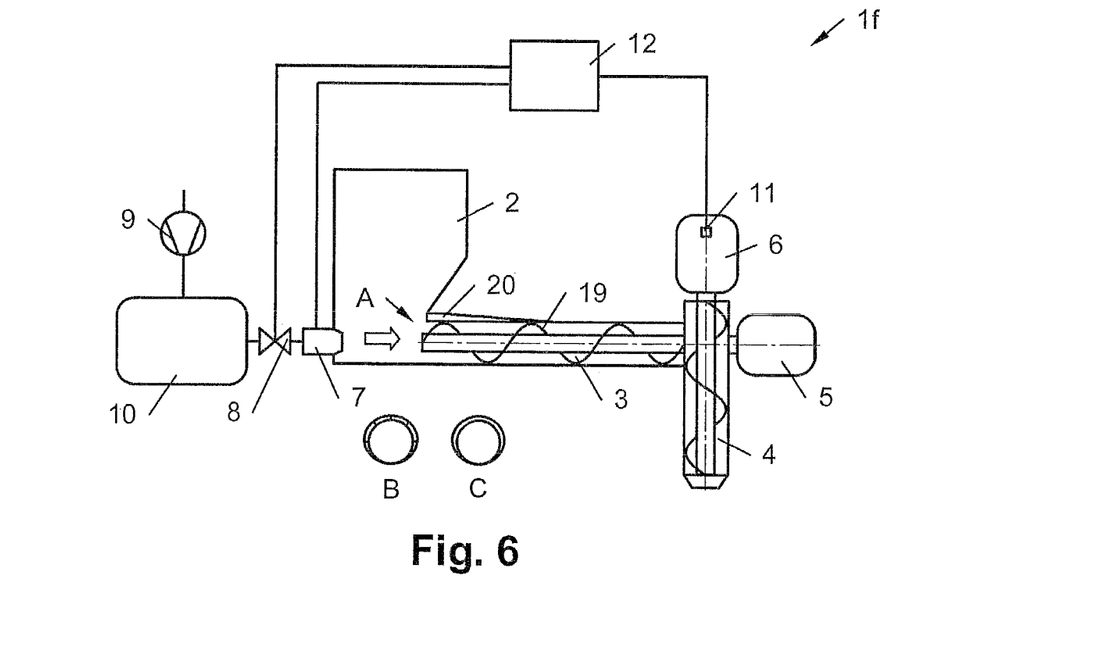
FIG. 6 as FIG. 1, but with continuous cutters on the conveying screw.

Finally, FIG. 6 shows an example of a device 1*f*, which is very similar to the device 1*e* shown in FIG. 5. However, in this version, the conveying screw 3 does not comprise teeth 15 or blades 17, but continuous cutters 19. These cutters 19 interact with fixed cutters 20, also causing the supplied material to be crushed.

The fixed cutters 20 may be designed as axially aligned cutters, for example (also see front view B) or may also run in a spiral manner (see front view C). It is particularly advantageous if the gradient of the fixed spiral cutters 20 is different from the gradient of the cutters 19 on the conveying screw 3, as this avoids load peaks in the drive moment. The spiral cutters 20 may be wound in the same direction as the cutters 19 on the conveying screw 3 or in the opposite direction. Finally, it would also be conceivable for the fixed cutters 20 to be perpendicular to the axis of the conveying screw 3.

As a general rule, it is advantageous if the fixed cutters 20 are only arranged in the upper and side regions of the conveying screw 3, as this prevents material collecting in the lower region of the conveying screw 3 and not being conveyed onwards. In addition, the tube in which the conveying screw 3 operates is shaped like a funnel, thus encouraging the plastic particles to enter the conveying screw 3. Naturally, the described eccentric configuration and/or the described funnel-shaped structure is also a suitable configuration for the teeth 15 and blades 17 shown in FIG. 5. On the other hand, a coaxial arrangement and/or a cylindrical arrangement with the conveying screw 3 is also possible for the cutters 20 in FIG. 6. Finally, it is also conceivable for the conveying screw 3 to comprise cutters 19, blades 17 and teeth 15, or any combination thereof.

Figure 7:
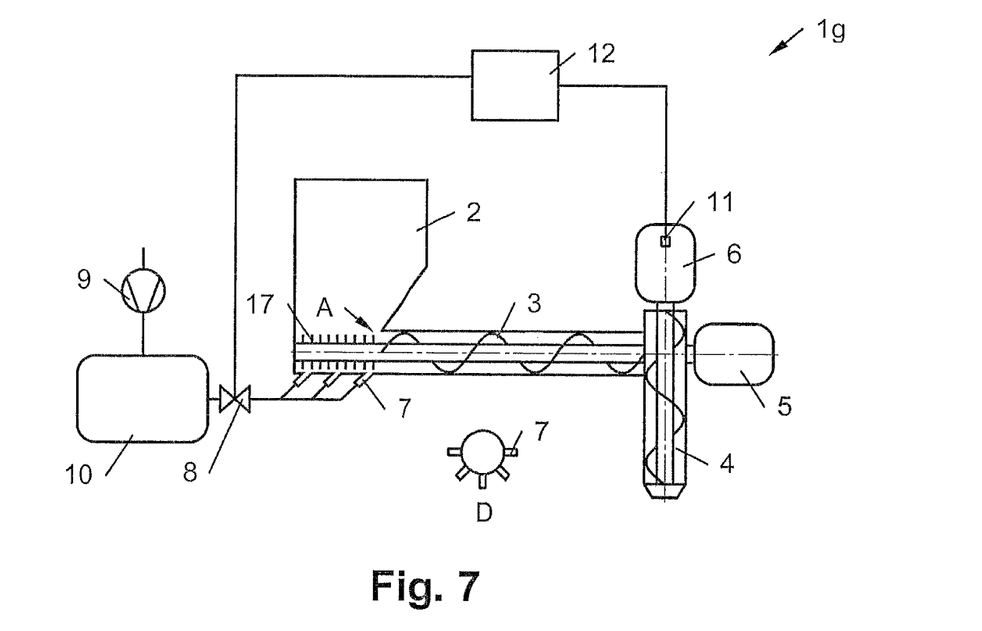
FIG. 7 as FIG. 1, but with a crushing device in the bottom region of the storage container and a plurality of obliquely aligned nozzles.

FIG. 7 shows another embodiment of a device 1g, in which crushing means or a crushing device is/are arranged in the form of blades 17 in the region of the storage container 2 and thus in front of the transfer opening A. The illustrated crushing device 17 is shown purely by way of an example and may also be designed in a different manner. For example, as shown in FIG. 5, counterblades 18 may also be provided, or the crushing device may also comprise teeth 15 with optional opposite teeth 16 (see also FIG. 5) and/or cutters 19 with optional countercutters 20 (see FIG. 6). The crushing device 17 may also comprise a separate drive (see also FIGS. 8 and 9), and the conveying screw may of course also protrude into the storage container 2 (this also applies to the examples shown in FIGS. 1 to 6.

Instead of a single nozzle positioned axially opposite the transfer opening A, in this example there are a plurality of nozzles 7, which are arranged in the region of the crushing device 17. The nozzles 7 are in particular inclined towards the transfer opening A, as shown in FIG. 7.

In the example shown in FIG. 7, a plurality of nozzles 7 are arranged around the circumference (see front view D) and distributed axially. This is advantageous, but not compulsory. In particular, it is also conceivable that the nozzles 7 are only arranged in the bottom region of the crushing device 17. It is also conceivable that only one single nozzle 7 is arranged in the region of the crushing device 17. In a preferred embodiment of the invention, the nozzles 7 may also in particular be arranged along a helix, and the nozzles 7 may also generate a helical air stream. It is specifically also conceivable for the nozzles 7 to be controllable individually or in groups in order to generate a desired flow or to guide said flow in a specific area.

Naturally, nozzles 7 arranged obliquely, nozzles 7 arranged in the bottom region of the storage container 2, nozzles 7 distributed radially and/or axially, and nozzles 7 arranged and/or aligned helically are not associated with the use of a crushing device 17 as shown in FIG. 7, but can also be used in particular in connection with the embodiments shown in FIGS. 1 to 6.

Figure 8:
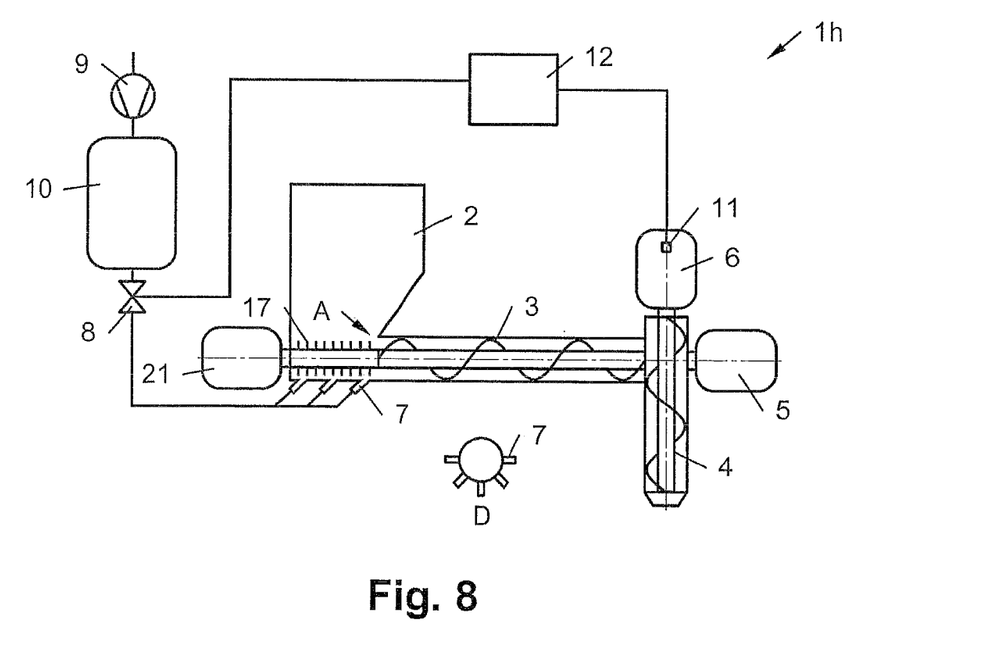
FIG. 8 as FIG. 7, but with a crushing device divided by the conveying screw and driven separately, and FIG. 9 a device in which the crushing device is arranged above the conveying screw and air outlets are arranged in the region of the conveying screw.

FIG. 8 shows a device 1h that is very similar to the device illustrated in FIG. 7. In contrast to FIG. 7, however, a crushing device in the form of a shaft with blades 17 is provided, said crushing device being separate from the conveying screw 3 and driven separately by a motor 21. In this way the grinding level of the material supplied to the conveying screw 3 can be influenced effectively. In concrete terms, the shaft with the blades 17 is rotated faster for small particle sizes and slower for large particle sizes.

Figure 9:
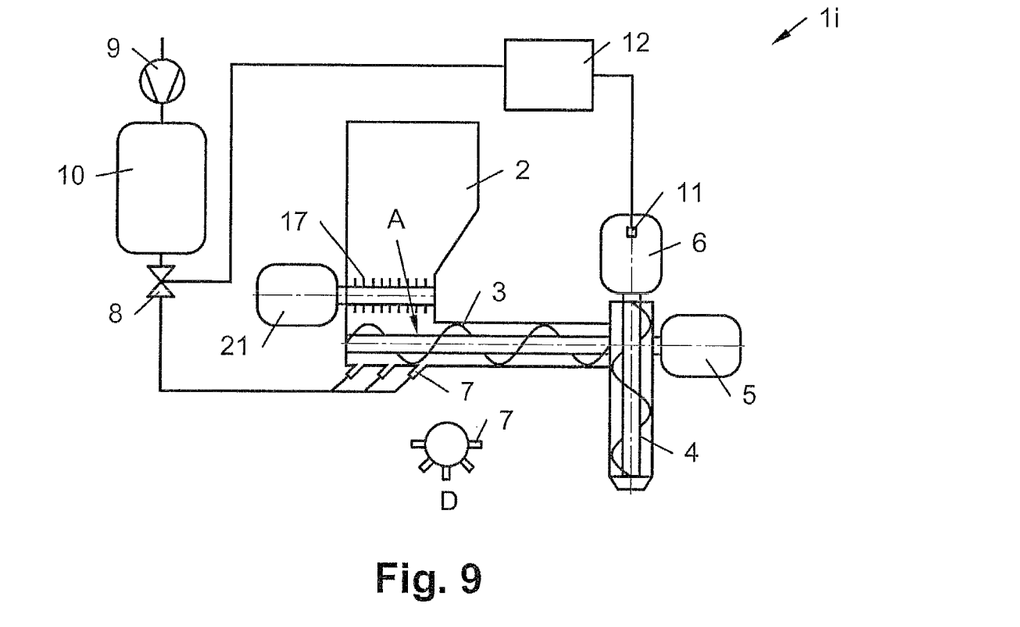

Finally, FIG. 9 shows a device 1i in which a crushing device in the form of a shaft with blades 17 is arranged above the conveying screw 3 and the nozzles 7 in the region of the conveying screw 3. As a result, it is possible to feed the material to be processed into the conveying screw 3 even more effectively.

In general terms, and in particular in the examples shown in FIGS. 1 to 9, air can be blown into the device continuously or in pulses (in other words with pauses between the blowing intervals). Accordingly, the valve 8 may be designed as a proportional valve or as a simple switching valve. The proportional valve allows the valve opening to be adjusted continuously, whereas the simple switching valve only permits discrete switching positions, i.e. "On" and "Off". In the pulsed mode, it is in particular possible to provide a variable pulse/pause ratio in order to vary the flow rate. The switching valve then acts in a similar manner to a proportional valve. In particular, it is also conceivable for the air to be blown in at room temperature or for this to be cooled or heated beforehand.

The particular advantage of a "real" proportional valve is that the air discharge speed and thus the flow rate from the nozzles 7 can be adjusted continuously at any required level. Accordingly, this makes it possible to keep turbulence in the storage container 2 and any associated dust formation to a comparatively low level. This is not possible to the same extent when using a pulsed switching valve. Admittedly, the switching valve pulsed with a variable pulse-pause ratio acts in the same way as a proportional valve when viewed macroscopically, but in the "on" position the compressed air emerges from the nozzles 7 with a very high (and macroscopically desirable) air stream at high speed, leading to the possibility of slight to significant turbulence in the storage container 2 and dust formation or dust discharge from the storage container 2. At this point, it should be noted that the air emerging from the nozzles 7 generally escapes via the storage container 2 and not via the conveying screw 3, which is usually "tightly" sealed by the extruder 4.

Another advantage is that the constant sound emitted by a proportional valve is perceived as being more pleasant than the comparatively loud and intermittent sound of the pulsed valve. In addition, a proportional valve has a relatively long service life due to its gentle operating regime.

Furthermore, another advantage of the proportional valve is that it does not become blocked as readily as a pulsed valve. A proportional valve generally makes it possible to achieve a constant flow rate of any strength. Blockage of the nozzle 7 is rather unlikely due to the continuous air discharge. If the compressed air is pulsed, backflow of the material stored in the storage container 2 into the nozzles 7 may occur in the associated pauses during air discharge, thus leading to blockage of said nozzles.

Another benefit of the proportional valve is that the discharge openings of the nozzles 7 can be selected to be relatively large without this being associated with a very high and undesirable air consumption. This can therefore also counteract blockage of the nozzles 7. If a proportional valve is not used, a nozzle opening would have to be designed to be relatively small for the given system pressure and if a low flow rate is desired, and this would accordingly be more likely to become blocked.

The comments associated with the proportional valve can be applied accordingly to other means of influencing a fluid flow, and in particular to proportionally adjustable sliders. Furthermore, the comments also apply to the flap 13, which may also be continuously adjustable or may have two discrete positions. In particular, a proportionally adjustable flap 13 may also help to reduce not only turbulence in the storage container 2, but also dust pollution and noise formation.

As a general rule, the supply of plastic particles to the conveying screw 3 may substantially be based on the air stream or may take place exclusively by means of the air stream. In this particular context, the term "substantially" specifically means that at least 70% of the supply of plastic particles to the conveying screw 3 is a result of the effect of the air stream. Other effects may, for example, include gravity and/or a helical portion of the conveying screw 3 protruding into the storage container 2/or into the conveying line 14 (see FIGS. 4 and 9). If at least 70% of the supply of plastic particles to the conveying screw 3 is based on the effect of the air stream, this means that the said supply falls to less than 30% if the air stream is switched off or diverted as far as possible away from the transfer opening A.

In particular, the supply of plastic particles to the conveying screw 3 is still able to take place without using sliders. This means that under no circumstances does the described device have a slider arranged opposite the conveying screw 3 and aligned with said screw, and accordingly this is not shown in the illustrated figures. However, the possibility of using a known slider is not specifically ruled out in the illustrated devices 1a . . . 1i. The plastic particles can then also be transported into the conveying screw 3 with the aid of the slider The embodiments illustrate possible variations of a device 1a . . . 1i for processing thermoplastic plastic and methods for operating such devices, with the proviso that the invention is not restricted to the variations of these embodiments specifically described, but that various combinations of the individual variations of the embodiments are also possible and these possible variations lie within the abilities of persons skilled in the art in this technical field on the grounds of teaching in relation to technical possibilities posed by the present invention. All conceivable variations of embodiments that might arise as a result of combinations of individual details of the illustrated and described variations of embodiments are therefore also possible. In particular, it should be noted that the embodiments illustrated in FIGS. 1 to 4 may also comprise crushing devices. It should also be noted that the extruder 4 may also be aligned in a different manner in all the illustrated embodiments, specifically coaxially with the conveying screw 3.

In particular, it should be noted that a device 1a . . . 1i may in reality comprise more or fewer components than illustrated.

Finally, as a matter of form, it should be noted that the device is sometimes not shown to scale and/or may be enlarged and/or reduced in size to facilitate understanding of the structure of the device 1a . . . 1i or its components respectively.

The object forming the basis for the independent innovative solutions can be found in the description.

LIST OF REFERENCE NUMERALS

1a . . . 1i device for processing thermoplastic plastic
2 storage container
3 conveying screw
4 extruder
5 first drive (for the conveying screw)
6 second drive (for the extruder)
7 air outlet (nozzle)
8 valve
9 compressor
10 pressure tank
11 means for recording the extruder load
12 control unit
13 flap
14 conveying line
15 teeth (on the conveying screw)
16 opposing teeth
17 blade
18 counterblade
19 continuous cutter (on the conveying screw)
20 countercutter
21 drive for blade shaft
A transfer opening

The invention claimed is:

1. A device for processing thermoplastic plastic, comprising:
   a storage container for receiving pieces of plastic particles or a conveying line for conveying the pieces of plastic particles;
   a transfer opening;
   a conveying screw connected to the storage container or the conveying line at the transfer opening;
   an extruder connected to the conveying screw;
   a drive for the extruder;
   at least one air outlet situated opposite the transfer opening and configurable to direct an air stream emerging from the at least one air outlet toward the transfer opening;
   a load recorder configured to record a load on the drive for the extruder;
   influencing means for influencing the air stream emerging from the at least one air outlet comprising a valve, a slider or a flap; and
   a control unit connected to the load recorder and the influencing means.

2. The device according to claim 1, wherein the control unit is designed to increase the air stream and/or direct the air stream to the transfer opening if the load on the extruder falls and vice versa.

3. The device according to claim 1, wherein the influencing means is configured to adjust on a proportional basis to a selected flow rate a strength or a direction of the air stream emerging from the at least one air outlet.

4. The device according to claim 1, wherein the influencing means has two discrete positions and the control unit is designed to control said influencing means with a variable pulse-pause ratio.

5. The device according to claim 1, wherein the conveying screw has a horizontal alignment or an alignment comprising at least one horizontal component.

6. The device according to claim 1, wherein a cross-section of the transfer opening has a vertical alignment or an alignment comprising at least a vertical component.

7. The device according to claim 1, wherein the conveying screw comprises crushing means arranged on said screw comprising teeth and/or blades and/or continuous cutting edges.

8. The device according to claim 7, wherein fixed opposing teeth, counterblades, or counter cutting edges are arranged in a region of the conveying screw and interact with the teeth, blades, or continuous cutting edges, respectively, of said screw.

9. The device according to claim 7, wherein the crushing means are arranged in a bottom region of the storage container.

10. The device according to claim 7, wherein a plurality of air outlets are arranged along a helix in the region of the conveying screw and/or the crushing means and/or are aligned in a direction of a helix.

11. A method for processing thermoplastic plastic comprising:
providing a device, which comprises a storage container for receiving pieces of plastic particles or a conveying line for conveying the pieces of plastic particles, a transfer opening, a conveying screw connected to the storage container or the conveying line at the transfer opening, an extruder connected to the conveying screw (3), a drive for the extruder, and at least one air outlet situated opposite the transfer opening and configurable to direct an air stream emerging from the at least one air outlet toward the transfer opening;
recording a load on the drive for the extruder; and
influencing the air stream emerging from the at least one air outlet, which is directed toward the transfer opening at least for some of the time, by adjusting or controlling strength and/or direction of the air stream as a function of a load on the extruder.

12. The method according to claim 11, wherein the air stream is increased and/or directed more towards the transfer opening when the load on the extruder falls and vice versa.

13. The method according to claim 11, wherein a speed of the drive of the extruder, a current consumed by said drive or a torsion in a shaft of the drive is measured in order to determine the load on the extruder.

14. The method according to claim 11, wherein a cross-section of the air stream supply line and/or a power output of a compressor is varied to adjust the strength of the air stream.

15. The method according to claim 11, wherein the direction of a discharge nozzle or the alignment of flaps on an outlet side of the air stream is varied to adjust the direction of the air stream.

16. The method according to claim 11, wherein the strength or the direction of the air stream is adjusted on a proportional basis to a selected flow rate.

17. The method according to claim 11, wherein the strength or the direction of the air stream is adjusted on a quasi-proportional basis by switching between two discrete values in a variable pulse-pause ratio.

18. The method according to claim 11, wherein a substantially helical air stream is produced.

* * * * *

UNITED STATES PATENT AND TRADEMARK OFFICE
CERTIFICATE OF CORRECTION

PATENT NO. : 10,792,672 B2  
APPLICATION NO. : 15/761494  
DATED : October 6, 2020  
INVENTOR(S) : Brzezowsky et al.

Page 1 of 1

It is certified that error appears in the above-identified patent and that said Letters Patent is hereby corrected as shown below:

On the Title Page

Item (73), the name of the Assignee, should correctly read:  
--Next Generation Recyclingmaschinen GmbH--

Signed and Sealed this  
Seventeenth Day of November, 2020

Andrei Iancu  
*Director of the United States Patent and Trademark Office*